US012801078B2

(12) United States Patent
Juri

(10) Patent No.: US 12,801,078 B2
(45) Date of Patent: Nov. 17, 2026

(54) CLEANING BLADE, PROCESS CARTRIDGE, AND IMAGE FORMING APPARATUS

(71) Applicant: Keiichiro Juri, Tokyo (JP)

(72) Inventor: Keiichiro Juri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/233,169

(22) Filed: Jun. 10, 2025

(65) Prior Publication Data

US 2025/0383621 A1 Dec. 18, 2025

(30) Foreign Application Priority Data

Jun. 13, 2024 (JP) ................................ 2024-096296

(51) Int. Cl.
*G03G 21/00* (2006.01)
*G03G 21/18* (2006.01)

(52) U.S. Cl.
CPC ..... *G03G 21/0017* (2013.01); *G03G 21/1814* (2013.01); *G03G 21/0029* (2013.01); *G03G 2221/0005* (2013.01)

(58) Field of Classification Search
CPC ........... G03G 21/0017; G03G 21/0029; G03G 21/1814; G03G 2221/0005
See application file for complete search history.

(56) References Cited

U.S. PATENT DOCUMENTS

2015/0078777 A1 3/2015 Juri et al.
2016/0004191 A1 1/2016 Juri et al.
2016/0187816 A1 6/2016 Matsushita et al.
2016/0202638 A1 7/2016 Takahashi et al.
2016/0202639 A1 7/2016 Matsushita et al.
2016/0259273 A1 9/2016 Izutani et al.
2016/0274489 A1 9/2016 Juri et al.
2016/0274500 A1 9/2016 Juri et al.
2016/0320740 A1* 11/2016 Toyama ............ G03G 21/0017
2017/0003643 A1 1/2017 Aoyama et al.
2017/0219954 A1 8/2017 Yasunaga et al.
2018/0017930 A1* 1/2018 Aoyama ............ G03G 21/0017
2018/0239297 A1 8/2018 Juri et al.
2020/0292954 A1 9/2020 Aoyama et al.
2020/0301348 A1 9/2020 Nakayama et al.
2022/0221817 A1 7/2022 Juri et al.
2023/0236536 A1 7/2023 Ohmori et al.
2024/0053700 A1 2/2024 Ohmori et al.
2024/0152085 A1 5/2024 Juri et al.
2024/0255889 A1 8/2024 Ohmori et al.
(Continued)

FOREIGN PATENT DOCUMENTS

JP H06-348193 A 12/1994
JP H07-306616 A 11/1995
(Continued)

*Primary Examiner* — Hoang X Ngo
(74) *Attorney, Agent, or Firm* — IPUSA, PLLC

(57) ABSTRACT

A cleaning blade includes: a blade substrate including an elastic member having a tip portion to contact with a surface of an object to clean the object; a blade support supporting the blade substrate; and a covering layer on the tip portion of the elastic member, and the covering layer has an average value of luminance histogram of 15,000 or more and 25,000 or less at a point 100 μm inward from a tip ridge of the tip portion of the elastic member.

16 Claims, 4 Drawing Sheets

(56) References Cited

U.S. PATENT DOCUMENTS

| | | | | |
|---|---|---|---|---|
| 2024/0369960 | A1 | 11/2024 | Kazuma et al. | |
| 2026/0064070 | A1* | 3/2026 | Juri .................... | G03G 21/0017 |

FOREIGN PATENT DOCUMENTS

| | | | |
|---|---|---|---|
| JP | H08-220962 | A | 8/1996 |
| JP | H09-258632 | A | 10/1997 |
| JP | H10-214009 | A | 8/1998 |
| JP | 2000-147972 | A | 5/2000 |
| JP | 2004-101551 | A | 4/2004 |
| JP | 2006-091566 | A | 4/2006 |
| JP | 2017-016083 | A | 1/2017 |

* cited by examiner

CLEANING BLADE, PROCESS CARTRIDGE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2024-096296, filed on Jun. 13, 2024, in the Japan Patent Office, the entire disclosure of which is hereby incorporated by reference herein.

BACKGROUND

Technical Field

The present embodiment relates to a cleaning blade, a process cartridge, and an image forming apparatus.

Related Art

An electrophotographic image forming apparatus includes a cleaner to remove residual toner adhering to a surface of an image bearer (also referred to as a member to be cleaned) from which a toner image has been transferred to a recording medium or an intermediate transfer body in an image forming step.

A cleaning blade is used as the cleaner because of its simple configuration and excellent cleaning performance. The cleaning blade generally includes an elastic member made of polyurethane rubber or the like and a support. Then, a base end of the elastic member is supported by the support, and a contact portion (tip ridge) of the elastic member is pressed against a surface of an image bearer. Thus, toner remaining on the surface of the image bearer is dammed up and scraped off to be removed. In a cleaner using the cleaning blade, the cleaning blade and the image bearer are in contact with each other. Therefore, friction between the cleaning blade and the image bearer occurs to increase torque that is a force necessary for rotating the image bearer. This may cause a failure in which the image bearer stops. In addition, due to the rubbing of the cleaning blade and the image bearer against each other, the contact portion may be worn and turned up, and toner may pass through the turned-up portion, resulting in a failure of incomplete cleaning.

SUMMARY

The present disclosure described herein provides a cleaning blade includes: a blade substrate including an elastic member having a tip portion to contact with a surface of an object to clean the object; a blade support supporting the blade substrate; and a covering layer on the tip portion of the elastic member, and the covering layer has an average value of luminance histogram of 15,000 or more and 25,000 or less at a point 100 μm inward from a tip ridge of the tip portion of the elastic member.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
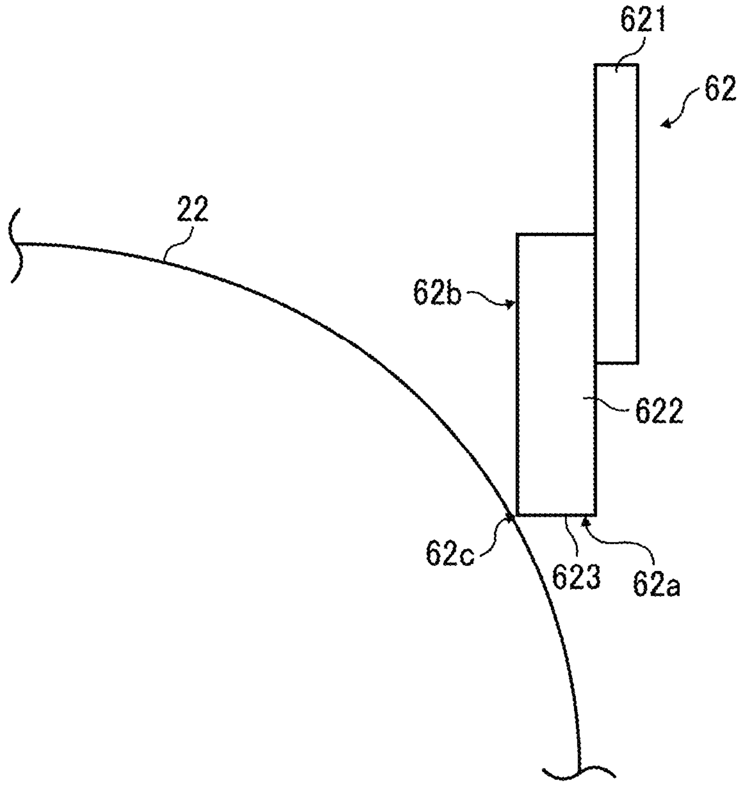
FIG. 1 is an exemplary schematic cross-sectional view of a cleaning blade and an image bearer, which illustrates a state in which the cleaning blade is in contact with a surface of the image bearer.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of the present embodiment, a cleaning blade will be described in which a cleaning blade 62 includes a cleaning blade support 621 and a cleaning blade substrate 622, and the cleaning blade substrate 622 includes an edge layer 622*a* and a base layer 622*b* having elasticity, a contact portion 62*c*, and a covering layer 623 covering at least a part of the cleaning blade substrate 622 including a contact side of the contact portion 62*c*. The cleaning blade support 621 and the cleaning blade substrate 622 may be referred to simply as a blade support and a blade substrate, respectively.

Furthermore, hereinafter, a description will be given of a case where an image bearer serves as a member to be cleaned by the cleaning blade of the present embodiment.

Hereinafter, a "blade substrate in the cleaning blade" may be referred to as a "blade substrate".

Cleaning Blade

The cleaning blade according to the present embodiment is a cleaning blade for coming into contact with a surface of a member to be cleaned and removing a residue on the surface of the member to be cleaned, the cleaning blade including: a cleaning blade substrate including an elastic member; and a cleaning blade support that supports the cleaning blade substrate, wherein the elastic member includes a covering layer provided at a tip portion to be brought into contact with the member to be cleaned, and the covering layer has an average value of a luminance histogram of 15,000 or more and 25,000 or less at a point 100 μm inward from a tip ridge on a lower surface of the cleaning blade substrate, and the point being located at a distance of 100 μm from the tip ridge. The cleaning blade further includes other members as necessary.

The cleaning blade of the present embodiment is a cleaning blade that removes a residue adhering to an image bearer, by coming into contact with the surface of the image bearer.

The residue is not particularly limited as long as the residue adheres to the surface of the image bearer and becomes an object to be removed by the cleaning blade. Examples of the residue include toner, lubricant, inorganic fine particles, organic fine particles, paper dust, dust, and mixtures thereof.

A cleaner using a conventional cleaning blade is disadvantageous in that a torque, which is a force necessary for rotating the image bearer, increases due to friction generated by contact between the cleaning blade and the image bearer, leading to a stop of rotation of the image bearer. The cleaner is also disadvantageous in that, due to the friction, a contact portion of the cleaning blade for contact with the image bearer is worn, the cleaning blade is turned up, and toner passes through, which causes a cleaning failure.

A step (touch-up) of applying, to a tip portion of the cleaning blade, metallic soap such as zinc stearate, polymethyl methacrylate (PMMA) particles, or the like as a lubricant is widely used for the purpose of improving the slidability of the cleaning blade and preventing the turning-up of the cleaning blade and an increase in torque. Generally, with operation of an image forming apparatus, toner gradually remains between the cleaning blade and the image bearer, and the toner functions as a lubricant. Therefore, the lubricant just needs to exhibit lubrication characteristics in a short period from the start of operation of the image forming apparatus until the stabilization of the behavior of the cleaning blade. However, fine particles contained in a conventional lubricant are disadvantageous in that due to weakness in adhesion to a base material, the fine particles are detached from a cleaning blade before the behavior of the cleaning blade is stabilized.

For the purpose of preventing detachment of the fine particles from the cleaning blade, there is known a technique for applying, to a contact portion of the cleaning blade for contact with the image bearer, a lubricant including the fine particles and a binding component for fixing the fine particles. The binding component makes the fine particles less likely to be detached from the cleaning blade. This is effective in preventing an increase in torque. However, the lubricant is likely to remain on the cleaning blade, and makes it difficult for the tip portion of the cleaning blade to be exposed. Therefore, pressure to be applied to the contact portion for contact with the image bearer decreases, leading to deterioration in cleaning performance. This is more remarkable when the amount of toner entering a nip portion between the cleaning blade and the image bearer is large as in the continuous printing of full solid images.

When the covering layer made of the lubricant is made brittle, an increase in torque is prevented, but the covering layer is likely to be scraped at the tip portion of the cleaning blade. As a result, the blade tip portion is exposed at an early stage to increase the pressure to be applied to the contact portion for contact with the image bearer. Therefore, cleaning performance can be maintained even when the amount of toner entering the nip portion between the cleaning blade and the image bearer is large as in the continuous printing of full solid images. It is thus possible to achieve both good cleaning performance and prevention of an increase in torque.

Therefore, the present embodiment is intended for a cleaning blade for cleaning an image bearer. The cleaning blade includes an edge layer and a covering layer, and the mean of a luminance histogram is 15,000 or more and 25,000 or less at a point located inward from the tip ridge on a blade lower surface of the covering layer, the point being located at a distance of 100 μm from the tip ridge. Thus, an increase in torque can be prevented even immediately after the start of use of an image forming apparatus, and it is possible to obtain the cleaning blade exhibiting good cleaning performance even when the amount of toner entering the nip portion between the cleaning blade and the image bearer is large as in the continuous printing of full solid images.

Covering Layer

The covering layer contains fine particles and a binding component immiscible with the fine particles, and further contains other components as necessary. The covering layer refers to a layer provided at one end portion to be used as a tip of the cleaning blade on a peripheral side surface of a blade substrate to be described below. The covering layer may be formed on at least a part of the blade substrate including a contact side on which the cleaning blade is in contact with the image bearer. Alternatively, the covering layer may be formed on the entire contact side, or may be formed on the entire surface of the blade substrate. Among these options, the covering layer is preferably formed on the entire contact side. A surface region of the blade substrate where the covering layer is not provided may be referred to as a non-coated region.

The average thickness of the covering layer on the cleaning blade is preferably 0.5 [μm] or more and 10 [μm] or less. When the average thickness of the covering layer is 0.5 [μm] or more, a sufficient sliding effect can be obtained. In addition, when the average thickness of the covering layer is 10 [μm] or less, it is possible to obtain an effect of maintaining cleaning performance due to brittleness of the covering layer. As the average thickness of the covering layer, it is possible to adopt the average of thicknesses [μm] measured at three or more points on the covering layer. Examples of the location of measurement of the average thickness in the covering layer include a point located inward from an end portion, the point being located at a distance of 100 μm from the end portion, and a central portion in the covering layer.

It is possible to measure the average thickness of the covering layer by scraping a part of the covering layer with a spatula, a cotton swab, or the like, and performing shape measurement by means of a contact-type surface roughness meter (Surftest SJ-500: manufactured by Mitutoyo Corporation) or a three-dimensional measuring machine such as a laser microscope (LEXT OLS4100: manufactured by Olympus Corporation).

Here, one embodiment and another embodiment of the cleaning blade will be described with reference to the drawings. However, application of the cleaning blade of the present disclosure is not limited to these embodiments at all. In the drawings, the same components are denoted by the same reference numerals, and redundant description may be omitted. Furthermore, the number, position, shape, and so forth of each constituent member to be described below are not limited to those described in the present embodiment, and may be set to a number, a position, a shape, and so forth suitable to implement the present embodiment.

Figure 2:
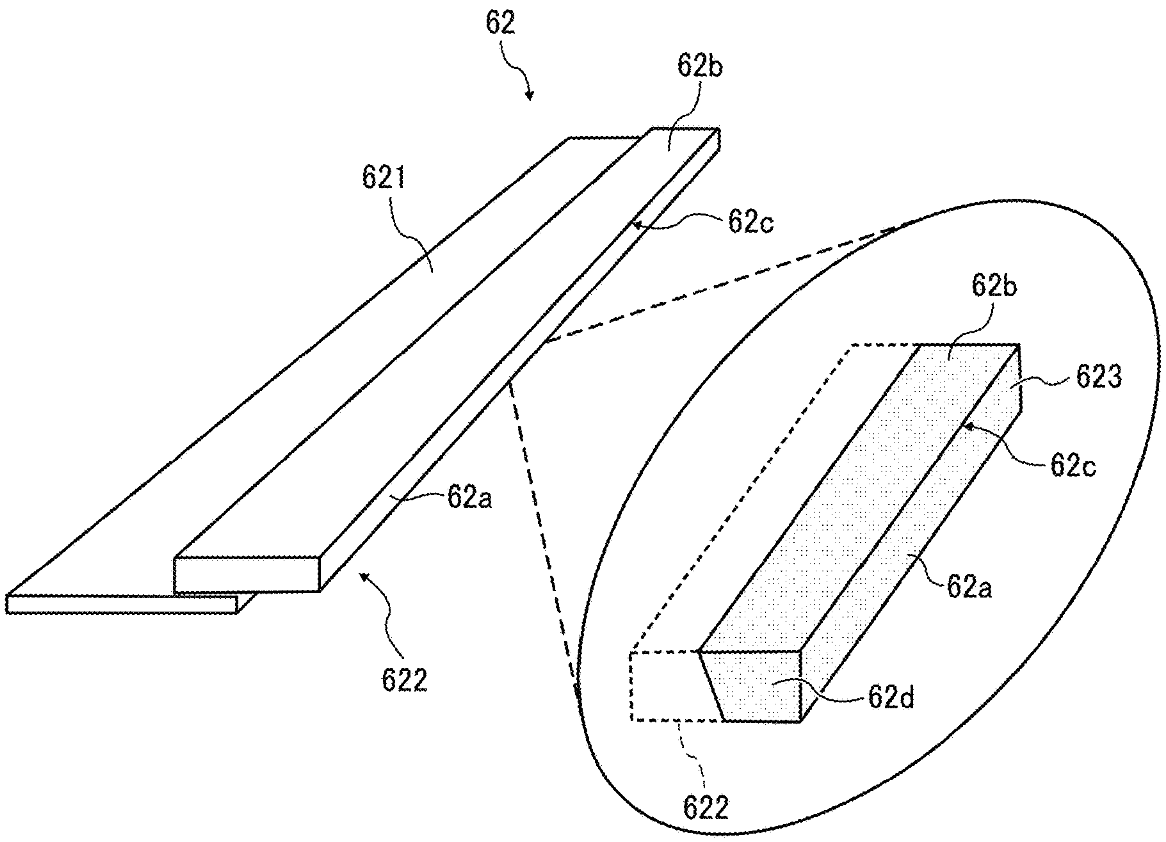
FIG. 2 is a perspective view of an exemplary image bearer cleaning blade according to the present embodiment.
Figure 3:
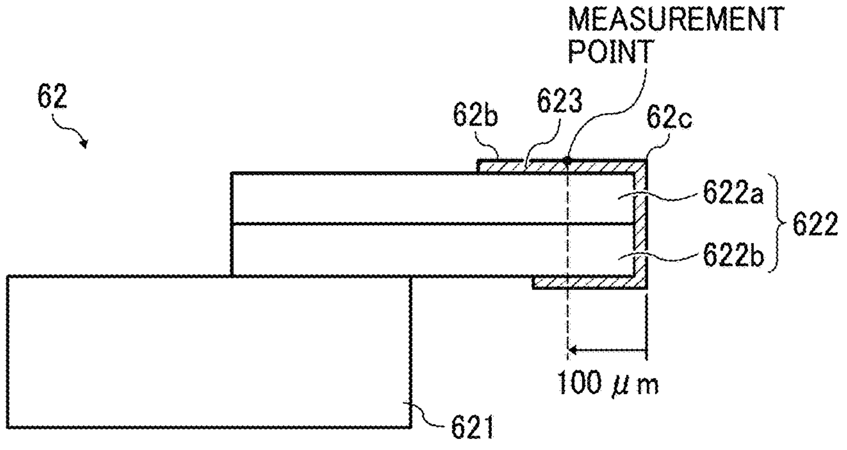
FIG. 3 is a schematic cross-sectional view of another exemplary image bearer cleaning blade according to the present embodiment.

FIG. 1 is a schematic cross-sectional view of a cleaning blade, which illustrates one embodiment of the cleaning blade. FIG. 2 illustrates a state in which the cleaning blade is in contact with a surface of an image bearer. FIG. 3 is a perspective view of the cleaning blade illustrated in FIG. 1 and an enlarged view of the vicinity of a contact portion. The cleaning blade 62 includes the cleaning blade support 621 and the cleaning blade substrate 622. The cleaning blade support 621 is a tabular member made of a rigid material such as metal or hard plastic. The cleaning blade substrate 622 is a tabular substrate having one end coupled to the cleaning blade support 621 and the other end with a free end portion of a predetermined length. The cleaning blade substrate 622 is secured to one end side of the cleaning blade support 621 with an adhesive or the like, and the other end side of the cleaning blade support 621 is cantilevered by a case of a cleaning device. The cleaning blade substrate 622 includes a cleaning blade tip end surface 62*a*, a cleaning blade lower surface 62*b*, the contact portion 62*c* which is one end on a free-end side of the cleaning blade substrate 622, and a cleaning blade side surface 62*d*, and also includes the covering layer 623 covering at least a part of the cleaning blade substrate 622 including the contact side of the contact portion 62*c*. The cleaning blade 62 is disposed such that the contact portion 62*c* is in contact with a surface of a photoconductor 3 along a longitudinal direction.

As illustrated in FIG. 1, the cleaning blade lower surface 62*b* is a surface of the cleaning blade substrate 622 on which the cleaning blade support 621 is not provided.

Figure 4:
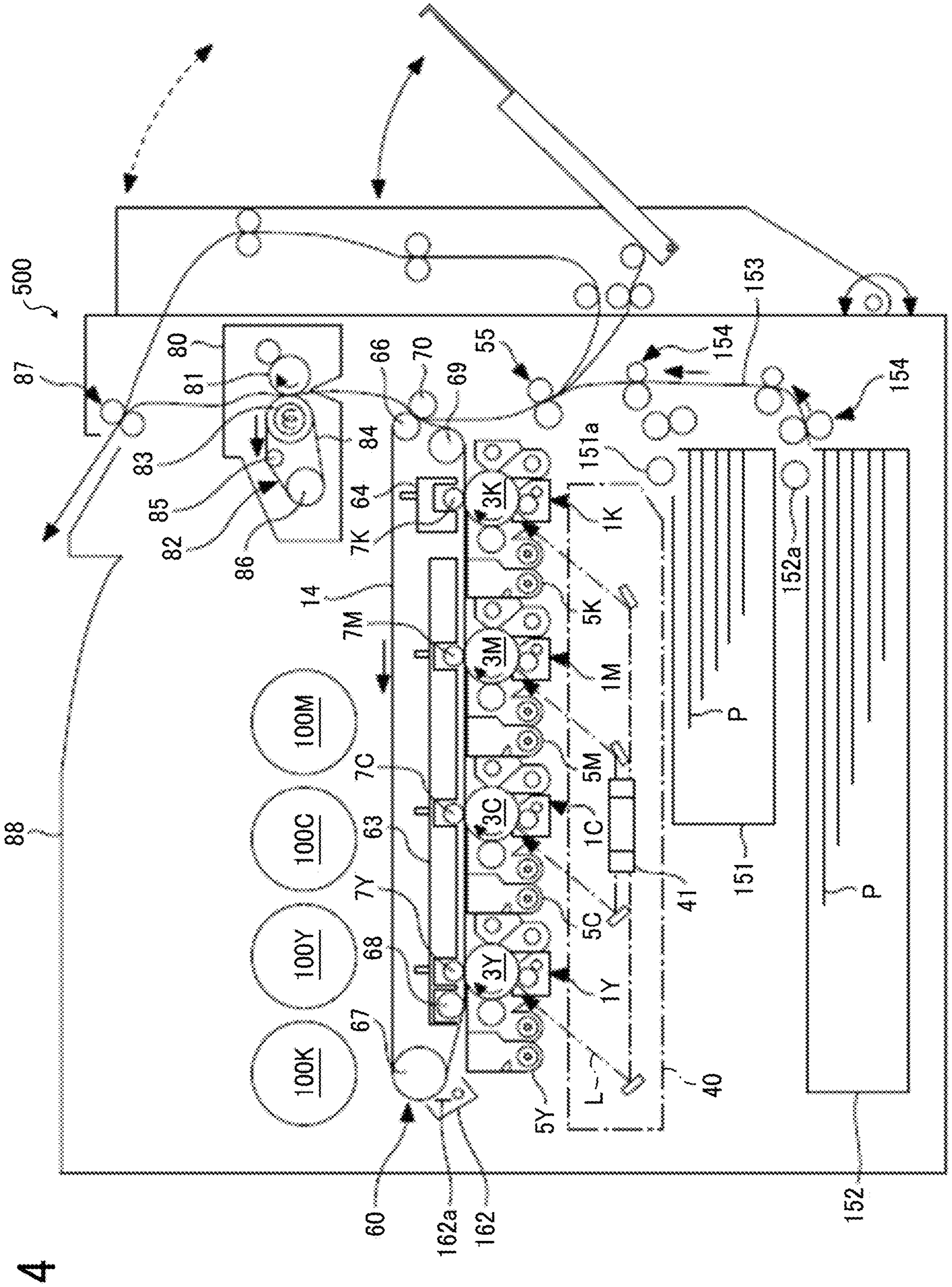
FIG. 4 is a schematic cross-sectional view of an exemplary image forming apparatus according to the present embodiment.

FIG. 4 is a schematic cross-sectional view of the cleaning blade, which illustrates another embodiment of the cleaning blade. A cleaning blade 62 includes a cleaning blade support 621 and a cleaning blade substrate 622. The cleaning blade substrate 622 includes an edge layer 622*a* and a base layer 622*b* having elasticity, a contact portion 62*c*, and a covering layer 623 covering at least a part of the cleaning blade substrate 622 including a contact side of the contact portion 62*c*. Note that a cleaning blade tip end surface 62*a*, a cleaning blade lower surface 62*b*, and a cleaning blade side surface 62*d* are omitted.

The covering layer in the present embodiment includes particles and a resin serving as a binding component. As one aspect of the present embodiment, the particles are preferably domains in a sea-island structure of the covering layer. It is preferable to select the type and amount of particles to be added, according to the type of resin serving as a binding component so that the particles become domains.

The shape of the particles is not particularly limited, and can be appropriately selected according to the purpose. The particles may have a regular shape or an indefinite shape. Among these options, the particles preferably have a regular shape. When the domain has a regular shape, the particles are preferably spherical in shape. Such a shape is preferable because it is possible to prevent a failure in which particles detached from the covering layer will damage the image bearer or the blade substrate in the cleaning blade.

The volume average particle diameter (50% volume diameter, median diameter) of the particles is not particularly limited, and can be appropriately selected according to the purpose, but is preferably 0.1 [μm] or more and 1 [μm] or less, more preferably 0.1 [μm] or more and 0.5 [μm] or less, and still more preferably 0.1 [μm] or more and 0.3 [μm] or less. When the volume average particle diameter of the particles is 1 [μm] or less, the particles easily settle in a solvent. Therefore, it is possible to prevent a failure in which it is difficult for the particles to stably disperse. When the volume average particle diameter of the particles is 0.5 [μm] or less, the particles can be more stably dispersed in a nonaqueous solvent.

The method for measuring the volume average particle diameter (50% volume diameter, median diameter) is not particularly limited, and can be appropriately selected according to the purpose. The volume average particle diameter can be measured by, for example, a laser diffraction scattering method, a dynamic light scattering method, or an image imaging method. Specific examples of the method for measuring the volume average particle diameter include a method in which particles collected from the covering layer of the cleaning blade are subjected to measurement based on the laser diffraction scattering method by use of Microtrac (manufactured by Nikkiso Co., Ltd.), and a method in which fine particles on the cleaning blade are directly observed and measured by use of a scanning electron microscope (SEM). The volume average particle diameter of particles added to the dispersion liquid to be applied to the cleaning blade differs little from the volume average particle diameter of particles present in the covering layer.

The amount of particles contained in the covering layer is not particularly limited, and can be selected according to the purpose. Meanwhile, the amount of particles contained in the covering layer is preferably 80 mass % or more and 99 mass % or less, and more preferably 90 mass % or more and 98 mass % or less with respect to the total mass of the covering layer from the viewpoint of obtaining a sliding effect and brittleness of the covering layer leading to easy detachment of the particles because of the covering layer containing relatively more particles than the binding component.

The material of the particles is not particularly limited, and can be selected according to the purpose. Examples of the material of the particles include polytetrafluoroethylene (PTFE), fluorinated ethylene-propylene copolymer (FEP), perfluoroalkoxy polymer (PFA), chlorotrifluoroethylene copolymer (CTFE), tetrafluoroethylene-chlorotrifluoroethylene copolymer (TFE/CTFE), ethylene-chlorotrifluoroethylene copolymer (ECTFE), and polychlorotrifluoroethylene (PCTFE). Among these options, polytetrafluoroethylene (PTFE) is preferable from the viewpoint of further improving the slidability of the cleaning blade.

Appropriately synthesized polytetrafluoroethylene (PTFE) may be used. Alternatively, a commercially available product of polytetrafluoroethylene (PTFE) may be used. Examples of the commercially available product of polytetrafluoroethylene (PTFE) include Dyneon TF Micro Powder TF-9201Z and Dyneon TF Micro Powder TF-9207Z (both manufactured by 3M Company), Nano FLON119N and FLUORO E (both manufactured by Shamrock Co., Ltd.), TLP10F-1 (manufactured by Du Pont-Mitsui Fluorochemicals Co., Ltd.), KTL-500F (manufactured by Kitamura Limited), and Algoflon L203F (manufactured by SOLVAY).

In the present embodiment, when the covering layer contains a binding component, the adhesion of the particles to the cleaning blade substrate is improved, and detachment of the covering layer can be prevented. Therefore, it is possible to prevent the turning-up of the cleaning blade and an increase in torque. As one aspect of the present embodiment, the binding component is preferably a matrix in the sea-island structure of the covering layer. It is preferable to select the type and amount of resin serving as the binding component in association with the particles so that the binding component becomes a matrix.

As long as the particles can be uniformly and stably dispersed, the binding component is not particularly limited, and can be appropriately selected according to the purpose. Examples of the binding component include vinylidene fluoride (VdF), hexafluoropropylene (HFP), and tetrafluoroethylene (TFE).

From the viewpoint of lubricity and adhesion to the blade substrate, a copolymer obtained by combination of these options is preferably used, and a VdF-HFP-TFE terpolymer is more preferably used.

The composition of VdF/HFP/TFE in the terpolymer is preferably 30 mol % to 80 mol %/10 mol % to 35 mol %/5 mol % to 35 mol % in each monomer unit from the viewpoint of imparting blade flexibility and solubility in a solvent.

The particles and the binding component are not limited to the examples described above, and can be appropriately selected according to the purpose. Examples of the particles and the binding component include inorganic compound fine particles, an acrylic resin, a styrene resin, and a vinyl resin. Examples of the inorganic compound fine particles include silica, alumina, and zirconia. One of these options may be used alone, or two or more of these options may be used in combination.

As particles other than the fluororesin, an acrylic resin is preferable. This is because the acrylic resin has a certain degree of hardness, so that it is possible to expect the effect of slidability. Meanwhile, the shape of particles is not particularly limited, and can be appropriately selected according to the purpose, but is preferably spherical. Such a shape is preferable because it is possible to prevent a failure in which particles other than the fluororesin, detached from the covering layer will damage the image bearer or the blade substrate in the cleaning blade.

The acrylic resin is not particularly limited, and can be appropriately selected according to the purpose. Examples of the acrylic resin include polymethyl (meta) acrylic acid, a styrene-(meta) acrylic acid methyl copolymer, and a styrene-(meta) acrylic acid ethyl copolymer. The acrylic resin may be in the form of acrylic resin particles.

The volume average particle diameter (50% volume diameter, median diameter) of the particles other than the fluororesin is not particularly limited and can be appropriately selected according to the purpose. Meanwhile, the volume average particle diameter of the particles other than the fluororesin is preferably 0.1 [μm] or more and 1 [μm] or less, more preferably 0.5 [μm] or less, and still more preferably 0.3 [μm] or less. When the volume average particle diameter of the particles is 1 [μm] or less, the particles easily settle in a solvent. Therefore, it is possible to prevent a failure in which it is difficult for the particles to stably disperse. When the volume average particle diameter of the particles is 0.5 [μm] or less, the particles can be more stably dispersed in a nonaqueous solvent.

The method for producing the covering layer is not particularly limited, and can be appropriately selected according to the purpose. For example, it is possible to obtain the covering layer by adding particles to a mixture of a solvent and a binding component, and applying a particle dispersion obtained from the mixture to a blade substrate in the cleaning blade.

The solvent is not particularly limited, and can be appropriately selected according to the purpose. For example, in the case of fluorine-based particles and a binding component, a fluorine-containing organic solvent can be cited as an example as the solvent. Examples of the fluorine-containing organic solvent include hydrofluoroether (HFE), perfluorocarbon (PFC), and perfluoroether (PFE). One of these options may be used alone, or two or more of these options may be used in combination.

In the present embodiment, the average particle diameter of the particles in the binding component based on a dynamic light scattering method (average particle diameter of cumulant analysis in scattering intensity distribution) is preferably 1 [μm] or less, more preferably 0.5 [μm] or less, and still more preferably 0.3 [μm] or less from the viewpoint of obtaining a uniform dispersion. Generally, even when fine particles having a volume average particle diameter of 1 [μm] or less are used, the particles are aggregated to form secondary particles. As a result, fine particles having a volume average particle diameter of 1 [μm] or more are formed. Even when the fluororesin dispersion is stored at a low viscosity for a long period of time, it is possible to obtain a stable dispersion by dispersing fine particles aggregated to form secondary particles, in such a way as to achieve a particle diameter of 1 [μm] or less. The dispersion method is not particularly limited, and can be appropriately selected according to the purpose. Examples of the dispersion method include a method using a disperser such as an ultrasonic disperser, a triple roll mill, a ball mill, a bead mill, or a jet mill.

The method for forming the covering layer is not particularly limited, and can be appropriately selected according to the purpose. Examples of the method for forming the covering layer include dipping in which the entire blade substrate in the cleaning blade or a part of the blade substrate is immersed in a particle dispersion and treated. In addition to the dipping, a coating method such as spray coating or a dispenser may be used.

Blade Substrate

In the present embodiment, the blade substrate in the cleaning blade may be referred to as a "blade substrate" or a "substrate". The shape of the blade substrate can be appropriately selected according to the purpose as long as the blade substrate has a structure that allows the residue on the image bearer to be removed. Meanwhile, it is preferable for the blade substrate to have a structure in which the contact side of the contact portion for contact between the blade substrate and the image bearer is linear. Examples of the shape of the blade substrate include a plate shape.

The structure of the blade substrate is not particularly limited, and can be appropriately selected according to the purpose. Examples of the structure of the blade substrate include a single-layer structure, a layered structure, and a layered structure in which multiple members is combined. Among these options, a single-layer structure and a layered structure including multiple members stacked in layers are preferable from the viewpoint of easy processing into the cleaning blade. When the blade substrate has a layered structure, a layer in contact with the image bearer may be referred to as an edge layer, and a layer that is not the edge layer may be referred to as a base layer. When the blade substrate is single-layered, the blade substrate includes only an edge layer. The multiple members in the layered structure more preferably differ in Martens hardness from each other.

A material of the blade substrate is not particularly limited, and can be appropriately selected according to the purpose. Meanwhile, the material of the blade substrate preferably has appropriate elasticity and hardness from a viewpoint of preventing wear of the blade substrate and a viewpoint of sufficiently removing the residue on the intermediate transfer body. Examples of the material of the blade include an elastic material. As long as the elastic material is highly elastic, the elastic material is not particularly limited, and can be appropriately selected according to the purpose. Examples of the elastic material include polyurethane rubber, silicone rubber, fluororubber, nitrile rubber (NBR), and ethylene propylene diene rubber (EPDM). Among these options, polyurethane rubber is preferable from the viewpoint of durability and anti-staining properties. The size of the blade substrate is not particularly limited, and can be appropriately selected according to the size of the image bearer.

The Martens hardness of the polyurethane rubber in the cleaning blade of the present embodiment is not particularly limited, and can be appropriately selected according to the purpose, but is preferably 0.5 [N/mm$^2$] or more and 2 [N/mm$^2$] or less. A cleaning failure occurs when it is difficult to obtain a blade linear pressure and an area of a contact portion for contact with the image bearer is likely to increase. A chip is caused when the blade substrate is excessively hard. However, when the Martens hardness of the polyurethane rubber in the cleaning blade is in a desired range, it is possible to eliminate faults such as the cleaning failure and the chip.

The method for producing the blade substrate is not particularly limited, and can be appropriately selected according to the purpose. Meanwhile, for example, it is possible to obtain the blade substrate by preparing a polyurethane prepolymer by use of a polyol compound and a polyisocyanate compound, adding a curing agent and a curing catalyst as necessary to the polyurethane prepolymer, centrifugally molding the polyurethane prepolymer by use of a predetermined mold, and leaving the polyurethane prepolymer to stand at normal temperature to age (cure) the polyurethane prepolymer, and cutting the cured polyurethane prepolymer into a flat plate shape with predetermined dimensions. The polyol compound is not particularly limited, and can be appropriately selected according to the purpose. Examples of the polyol compound include a high-molecular weight polyol and a low-molecular weight polyol.

Examples of the high-molecular weight polyol include a polyester polyol which is a condensate of an alkylene glycol and an aliphatic dibasic acid; polyester-based polyols such as polyester polyols of alkylene glycols and adipic acid, such as ethylene adipate ester polyols, butylene adipate ester polyols, hexylene adipate ester polyols, ethylene propylene adipate ester polyols, ethylene butylene adipate ester polyols, and ethylene neopentylene adipate ester polyols; polycaprolactone-based polyols such as polycaprolactone ester polyols obtained by ring-opening polymerization of caprolactone; and polyether-based polyols such as poly(oxytetramethylene) glycol and poly(oxypropylene) glycol. One of these options may be used alone, or two or more of these options may be used in combination.

Examples of the low-molecular weight polyol include dihydric alcohols such as 1,4-butanediol, ethylene glycol, neopentyl glycol, hydroquinone-bis(2-hydroxyethyl) ether, 3,3'-dichloro-4,4'-diaminodiphenylmethane and 4,4'-diaminodiphenylmethane; and trihydric or higher polyhydric alcohols such as 1,1,1-trimethylolpropane, glycerin, 1,2,6-hexanetriol, 1,2,4-butanetriol, trimethylolethane, 1,1,1-tris (hydroxyethoxymethyl) propane, diglycerin, and pentaerythritol. One of these options may be used alone, or two or more of these options may be used in combination.

The polyisocyanate compound is not particularly limited, and can be appropriately selected according to the purpose. Examples of the polyisocyanate compound include methylene diphenyl diisocyanate (MDI), tolylene diisocyanate (TDI), xylylene diisocyanate (XDI), naphthylene 1,5-diisocyanate (NDI), tetramethylxylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethylhexamethylene diisocyanate (TMDI). One of these options may be used alone, or two or more of these options may be used in combination.

The curing agent is not particularly limited, and can be appropriately selected according to the purpose. Examples of the curing agent include amines and alcohols. One of these options may be used alone, or two or more of these options may be used in combination. The curing agent is used, for example, for adjusting the hardness of the blade substrate.

The curing catalyst is not particularly limited, and can be appropriately selected according to the purpose. Examples of the curing catalyst include 2-methylimidazole and 1,2-dimethylimidazole. The amount of contained curing catalyst is not particularly limited, and can be appropriately selected according to the purpose. Meanwhile, the amount of contained curing catalyst is preferably 0.01 mass % or more and 0.5 mass % or less, and more preferably 0.05 mass % or more and 0.3 mass % or less with respect to the sum of the mass of prepolymer and curing agent.

The modulus of repulsion elasticity of the blade substrate in conformity with JIS K6255 standard is not particularly limited, and can be appropriately selected according to the purpose, but is preferably 10% to 80% at 23° C. When the modulus of repulsion elasticity is within a desired range, it is possible to eliminate a cleaning failure caused by inflexibility of the entire blade substrate and inability to follow the shake and roughness of the image bearer and a defect such as blade squeal (abnormal noise) caused by too strong repulsion. For example, it is possible to measure the modulus of repulsion elasticity of the blade substrate in conformity with JIS K6255 standard at 23° C. by using Resilience tester No. 221 manufactured by Toyo Seiki Seisaku-sho, Ltd.

Average Value of Luminance Histogram

In the cleaning blade of the present embodiment, the average value of the luminance histogram is 15,000 or more and 25,000 or less at the point located inward from the tip ridge in the covering layer on the lower surface of the cleaning blade substrate, the point being located at a distance of 100 μm from the tip ridge. Note that the "point located inward from the tip ridge, the point being located at a distance of 100 μm from the tip ridge" refers to, for example, a measurement point illustrated in FIG. 3. When the average value of the luminance histogram is 15,000 or more and 25,000 or less, it is possible to sufficiently obtain the effect of enabling the covering layer to be easily collapsed. The average value of the luminance histogram can be acquired from a luminance image by a confocal laser microscope. The luminance histogram acquired from the luminance image of the confocal microscope is a histogram of the intensity of light reflected from the surface of the covering layer. The covering layer of the present embodiment includes particles and a binding component. The fact that the covering layer is likely to collapse indicates a state in which the binding component around the particles is relatively small in amount, and indicates that since voids between the particles are relatively large, the light reflected from the surface of the covering layer increases. As a result, the average value of the luminance histogram increases. In the cleaning blade of the present embodiment, the average value of the luminance histogram is preferably 18,000 or more and 22,000 or less at a point located inward from a tip ridge of the edge layer, the point being located at a distance of 100 μm from the tip ridge, from the viewpoint of achieving both the sliding effect and good cleaning performance due to the easy collapse of a film. When the average value of the luminance histogram is 15,000 or more at the point located inward from the tip ridge of the edge layer in the cleaning blade, the point being located at a distance of 100 μm from the tip ridge, the covering layer is likely to collapse. This is advantageous in that cleaning performance can be maintained even when high-density images are continuously printed. When the average value of the luminance histogram is less than 15,000 at the point located inward from the tip ridge of the edge layer in the cleaning blade, the point being located at a distance of 100 μm from the tip ridge, the covering layer is less likely to collapse. Therefore, cleaning performance cannot be maintained when high-density images are continuously printed. In contrast, when the average value of the luminance histogram exceeds 25,000, the covering layer is too likely to collapse. This causes the following disadvantages: the slidability cannot be maintained, or the covering layer falls off from the cleaning blade on its own when not in use. Note that the measurement of the average value of the luminance histogram in the present embodiment is performed on a product processed into a cleaning blade.

Measurement of Average Value of Luminance Histogram

Using a confocal laser microscope (OLS-4100 manufactured by Olympus Corporation), a luminance image of the surface of the covering layer was acquired by means of a 100-fold magnification objective lens. A luminance histogram at 100 μm from the tip was acquired by an attached analysis application, and the mean thereof was adopted.

Measurement of Martens Hardness

The location of measurement of the Martens hardness in the base layer of the cleaning blade is not particularly limited, but was set to a point located inward from an end portion of the base layer, the point being located at a distance of 20 [μm] from the end portion for ease of measurement. The Martens hardness indicates the median of numerical values obtained by measurement at four to six points at each measurement location. It is possible to measure the Martens hardness in conformity with ISO14577 by continuously pushing a Berkovich indenter for 10 seconds by means of a nanoindenter (ENT-3100, manufactured by Elionix Inc.) until a maximum load reaches 1,000 μN, holding the indenter for 5 seconds, and unloading the indenter at the same loading speed for 10 seconds.

Image Forming Apparatus and Image Forming Method

The image forming apparatus according to the present embodiment includes at least: an image bearer; a charger that charges a surface of the image bearer, an exposing device that exposes the charged image bearer to form an electrostatic latent image, a developer that develops the electrostatic latent image by means of toner to form a visible image, a transferring device that transfers the visible image to a recording medium via an intermediate transfer body; a fixing device that fixes the transfer image transferred to the recording medium; and a cleaner that removes toner remaining on the intermediate transfer body, and further includes other means appropriately selected as necessary. The charger and the exposing device may be collectively referred to as an electrostatic latent image forming means. Each of the cleaner includes the cleaning blade of the present embodiment. An image forming method used in the present embodiment includes at least a charging step, an exposure step, a developing step, a transfer step, a fixing step, and a cleaning step, and further includes other steps appropriately selected as necessary. The charging step and the exposure step may be collectively referred to as an electrostatic latent image forming step. The image forming method used in the present embodiment can be more suitably performed by the image forming apparatus of the present embodiment. The charging step can be performed by the charger. The exposure step can be performed by the exposing device. The developing step can be performed by the developer. The transfer step can be performed by the transferring device. The fixing step can be performed by the fixing device. The cleaning step can be performed by the cleaner. The cleaner includes the cleaning blade of the present embodiment. The other steps can be performed by the other means.

Image Bearer

The image bearer is not particularly limited in terms of structure, size, and the like, and can be appropriately selected from known ones. The shape of the image bearer is not particularly limited, and can be appropriately selected according to the purpose. Examples of the shape of the image bearer include a drum-like shape and a belt-like shape. The material of the image bearer is not particularly limited, and can be appropriately selected according to the purpose. Examples the material of the image bearer include inorganic photoconductors such as amorphous silicon and selenium, and organic photoconductors (OPC) such as polysilane and phthalopolymethine.

Examples of the organic photoconductor include a layered photoconductor and a single-layer photoconductor. The layered photoconductor has a layered structure in which a layer (charge generation layer) obtained by dispersion of a charge generation material such as metal-free phthalocyanine or titanyl phthalocyanine in a binder resin and a layer (charge transport layer) obtained by dispersion of a charge transport material in a binder resin are stacked on a support such as an aluminum drum. The single-layer photoconductor includes a photosensitive layer having a single-layer structure in which both a charge generation material and a charge transport material are dispersed in a binder resin on a support. It is also possible to add, to the photosensitive layer, a hole transport agent and an electron transport agent as charge transport materials in the single-layer photoconductor.

In addition, an undercoat layer may be provided between the support and the charge generation layer in the layered structure or the photosensitive layer in the single-layer structure.

Charging Step and Charger

The charging step is a step of charging the surface of the image bearer, and is performed by the charger. As long as the charger can charge the surface of the image bearer, the charger is not particularly limited, and can be appropriately selected according to the purpose. Examples of the charger include contact chargers known per se including a conductive or semiconductive roller, brush, film, rubber blade, and the like, and non-contact chargers using corona discharge, such as corotron and scorotron. With regard to the shape of the charger, the charger may have any form such as a roller, a magnetic brush, or a fur brush, and the form of the charger can be selected according to the specifications and form of an electrophotographic image forming apparatus. In the case of using a magnetic brush, the magnetic brush uses various ferrite particles such as Zn—Cu ferrite as a charger, and includes a nonmagnetic conductive sleeve for supporting the charger, and a magnet roll included in the conductive sleeve. In the case of using a brush, it is possible to use the brush as a charger by, for example, using, as a material of a fur brush, a fur subjected to conductive treatment with carbon, copper sulfide, metal, or a metal oxide, and by winding or sticking the fur around a metal or a cored bar subjected to other conductive treatment The charger is not limited to the contact-type charger as described above. Meanwhile, it is preferable to use such a charger because an image forming apparatus can be obtained in which ozone generated from the charger is reduced. The charger is preferably disposed in a state of being in contact with or not in contact with the image bearer, and preferably charges the surface of the image bearer by superimposing direct-current and alternating-current voltages. In addition, the charger is also preferably a charging roller that is disposed, in a non-contact manner, close to the image bearer with a gap tape, and charges the surface of the image bearer by superimposing direct-current and alternating-current voltages on the charging roller.

Exposure Step and Exposing device

The exposure step is a step of exposing the charged surface of the image bearer, and is performed by the exposing device. It is possible to perform the exposure by, for example, imagewise exposure of the surface of the image bearer by means of the exposing device. An optical system in the exposure is roughly divided into an analog optical system and a digital optical system. The analog optical system is an optical system that directly projects a document onto the surface of the image bearer by an optical system. The digital optical system is an optical system that receives image information as an electric signal, converts the electric signal into an optical signal, and exposes the image bearer to form an image.

As long as it is possible to form an electrostatic latent image by exposing the charged image bearer, the exposing device is not particularly limited, and can be appropriately selected according to the purpose. Examples of the exposing device include various exposure devices such as a copying optical system, a rod lens array system, a laser optical system, a liquid crystal shutter optical system, and a light-emitting diode (LED) optical system. Note that an optical backplane method in which imagewise exposure is performed from a back surface side of the image bearer may be adopted in the present embodiment.

Developing Step and Developer

The developing step is a step of developing the electrostatic latent image into the toner image, and is performed by the developer. As long as it is possible to develop the electrostatic latent image into a toner image, the developer is not particularly limited, and can be appropriately selected according to the purpose. For example, the developer includes at least a developing device that stores the toner and can apply the toner to the electrostatic latent image in a contact or non-contact manner. The developing device may be of a dry developing type or a wet developing type, or may be a monochromatic developing device or a multicolor developing device. Examples of the developing device include a device including a stirrer that frictionally stirs and charges the toner and a rotatable magnet roller. In the developing device, for example, the toner and a carrier are mixed and stirred as necessary, the toner is charged by friction generated at that time, and the toner is held on a surface of the rotating magnet roller in a napped state to form a magnetic brush. Since the magnet roller is disposed in the vicinity of the image bearer, a part of the toner included in the magnetic brush formed on the surface of the magnet roller moves to the surface of the image bearer by an electric attraction force of the electrostatic latent image. As a result, the electrostatic latent image is developed by the toner, and the toner image is formed on the surface of the image bearer. The toner to be stored in the developing device may be a developer containing the toner, and the developer may be a one-component developer or a two-component developer. Note that the toner can also be used as a one-component magnetic toner that uses no carrier, or a non-magnetic toner. As a developing method, a premix developing method may be adopted which is a method for supplying a premix developer in which toner and a carrier are mixed in advance. In the premix developing method, increased carriers in the developing device are discharged as excess developer. Accordingly, the developer in the developing device is gradually refreshed. Therefore, it is possible to extend the cycle of replacement accompanying deterioration of the developer and to save time and effort for replacing the developer.

Transfer Step and Transferring Device

The transfer step is a step of transferring the toner image to a recording medium, and is performed by the transferring device. The transfer step preferably includes, for example, a primary transfer step of using an intermediate transfer body and transferring the toner image to a surface of the intermediate transfer body to form a composite transfer image, and a secondary transfer step of transferring the composite transfer image to a recording medium. As long as it is possible to transfer the toner image to a recording medium, the transferring device is not particularly limited, and can be appropriately selected according to the purpose. The transferring device preferably includes a primary transferring device of transferring the toner image to the surface of the intermediate transfer body to form a composite transfer image, and a secondary transferring device of transferring the composite transfer image to a recording medium. The primary transferring device and the secondary transferring device preferably include, for example, at least a transfer device that peels, from the surface of the image bearer, the toner image formed on the surface of the image bearer and transfers the toner image to a recording medium. The transfer device is not particularly limited, and can be appropriately selected according to the purpose. Examples of the transfer device include a corona transfer device using corona discharge, a transfer belt, a transfer roller, a pressure transfer roller, and an adhesive transfer device. The number of the transfer devices may be one, or two or more.

As long as the recording medium can transfer the toner image that has not yet been fixed after development, the recording medium is not particularly limited, and can be appropriately selected according to the purpose. Meanwhile, plain paper is typically used, but for example, a polyethylene terephthalate (PET) base for an overhead projector (OHP) can also be used.

Fixing Step and Fixing Device

The fixing step is a step of fixing the toner image transferred to the recording medium, and is performed by the fixing device. In a case where two or more colors of toner are used, the toner of each color may be fixed every time the toner of each color is transferred to the recording medium. Alternatively, the toner of all colors may be fixed in the state of being transferred to the recording medium and layered. As long as the fixing device can fix the toner image transferred to the recording medium, the fixing device is not particularly limited, and can be appropriately selected according to the purpose. A heat fixing system using a known heating and pressurizing means can be adopted as the fixing device. The heating and pressurizing means is not particularly limited, and can be appropriately selected according to the purpose. Examples of the heating and pressurizing means include a combination of a heating roller and a pressurizing roller, and a combination of a heating roller, a pressurizing roller, and an endless belt. Heating temperature is not particularly limited, and can be appropriately selected according to the purpose. Meanwhile, heating is preferably performed at a temperature of 80° C. to 200° C. Note that, for example, a known optical fixing device may be used together with the fixing device as necessary.

Cleaning Step and Cleaner

The cleaning step is a step of removing the toner remaining on the surface of the image bearer, and is performed by the cleaner. One in which the cleaning blade of the present embodiment is secured to a support is used as the cleaner.

The linear pressure to be applied to the surface of the image bearer by the blade substrate in the cleaning blade of the present embodiment is not particularly limited, and can be appropriately selected according to the purpose. Meanwhile, the linear pressure is preferably 10 N/m or more and 100 N/m or less, and more preferably 10 N/m or more and 50 N/m or less. When the linear pressure is 10 N/m or more and 100 N/m or less, a cleaning failure in which the toner slips between the contact portion and the image bearer is less likely to occur, and it is possible to easily prevent the turning-up of the elastic body. It is possible to measure the linear pressure by using, for example, a measuring device incorporating a compact compression type load cell manufactured by Kyowa Electronic Instruments Co., Ltd.

An angle (hereinafter, referred to as a "cleaning angle") formed by a tangent line of the image bearer and the tip surface of the free end in the blade substrate at a position where the contact portion of the blade substrate in the cleaning blade of the present embodiment is in contact with the image bearer is not particularly limited, and can be appropriately selected according to the purpose. Meanwhile, the angle is preferably 65° or more and 85° or less. When the cleaning angle is 65° or more and 85° or less, occurrence of the turning-up of the blade substrate can be easily prevented, and occurrence of cleaning failure can also be easily reduced.

Other Steps and Other Means

Examples of the other steps include a static elimination step, a recycling step, and a control step. Examples of the other means include a static elimination means, a recycling means, and a control means.

Static Elimination Step and Static Elimination Means

The static elimination step is a step of applying a static elimination bias voltage to the image bearer to perform static elimination, and is performed by the static elimination means. As long as a static elimination bias voltage can be applied to the image bearer, the static elimination means is not particularly limited, and can be appropriately selected according to the purpose. Examples of the static elimination means include a static elimination lamp.

Recycling Step and Recycling Means

The recycling step is a step of causing the developer to recycle the toner removed in the cleaning step, and is performed by the recycling means. The recycling means is not particularly limited, and can be appropriately selected according to the purpose. Examples of the recycling means include a known conveyance means.

Control Step and Control Means

The control step is a step of controlling each of the steps, and is performed by the control means. As long as movement of each means can be controlled, the control means is not particularly limited, and can be appropriately selected according to the purpose. Examples the control means include devices such as a sequencer and a computer.

An example of the image forming apparatus according to the present embodiment is described with reference to the drawings. However, an application of the cleaning blade is not limited to these embodiments. In the drawings, the same components are denoted by the same reference numerals, and redundant description may be omitted. Furthermore, the number, position, shape, and so forth of each constituent member to be described below are not limited to those described in the present embodiment, and may be set to a number, a position, a shape, and so forth suitable to implement the present embodiment.

Figure 5:
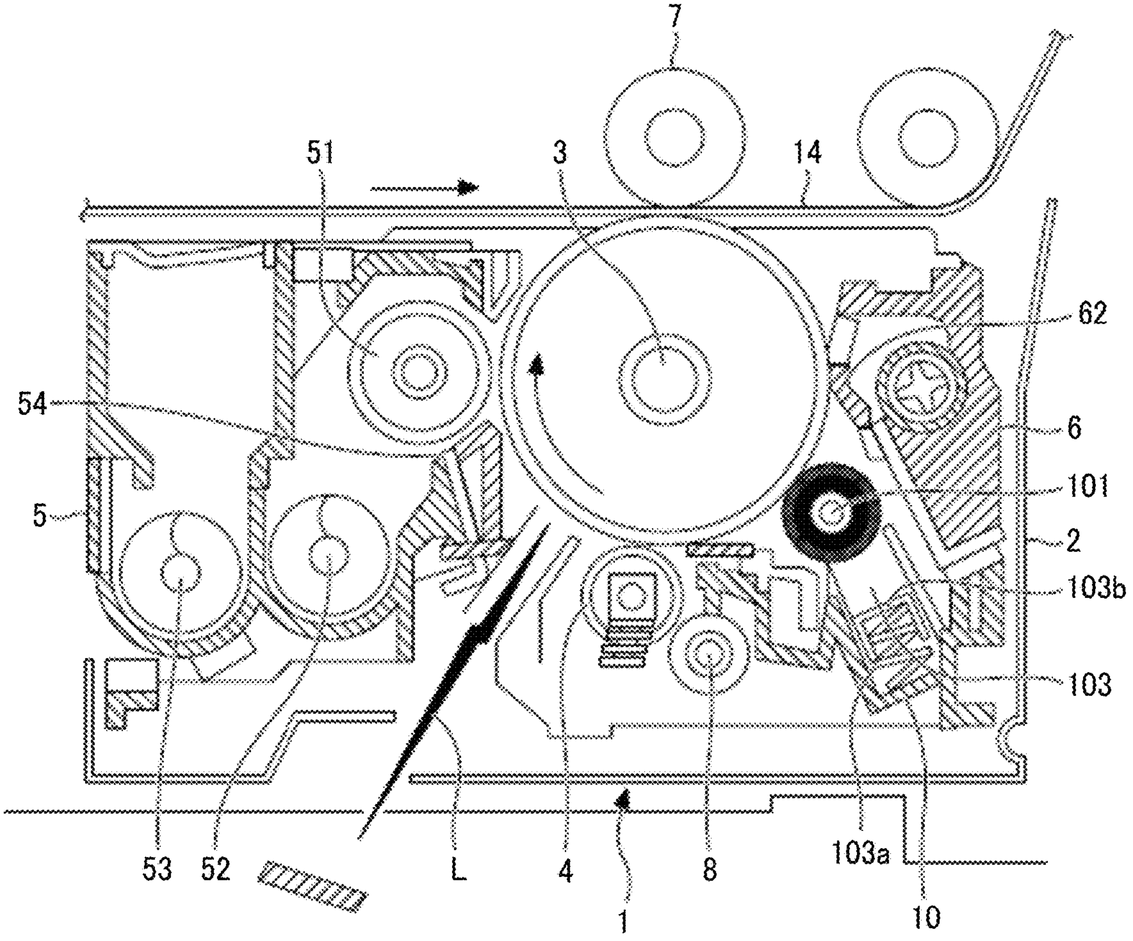
FIG. 5 is a schematic cross-sectional view of an exemplary image forming unit in the image forming apparatus of FIG. 4.

FIG. 5 is a schematic configuration diagram illustrating an exemplary configuration of the image forming apparatus of the present embodiment. The image forming apparatus includes four image forming units for yellow, magenta, cyan, and black (hereinafter, may be abbreviated as Y, M, C, and BK, respectively). The Y, M, C, and BK toners having different colors are used as image forming substances for forming an image. Except for this point, the Y, M, C, and BK toners have the same configuration.

Each image forming unit includes a photoconductor drum 21 (cyan photoconductor drum 21C, yellow photoconductor drum 21Y, magenta photoconductor drum 21M, or black photoconductor drum 21BK), a charger, an exposure device 12, a developing device 20 (cyan developing device 20C, yellow developing device 20Y, magenta developing device 20M, or black developing device 20BK), a transfer charger, a cleaning device 13, and a static elimination lamp. The charger uniformly charges the photoconductor drum 21. The exposure device 12 exposes the photoconductor drum 21, and forms a latent image of each color on the photoconductor drum 21, on the basis of image information on each color. The developing device 20 is a developer that develops the latent image with a developer of each color, and forms a toner image of each color. The transfer charger transfers the toner image onto an intermediate transfer belt 22. The charger is a charging member included in a charging device serving as a charger. The developing device 20 is a developer that converts a latent image formed on the surface of the photoconductor drum 21 into a toner image. The cleaning device 13 is a cleaner that cleans toner remaining on the photoconductor drum 21 from which the toner image has been transferred to the intermediate transfer belt 22. The static elimination lamp is a static elimination means that neutralizes the surface potential of the photoconductor drum 21 that has been cleaned. Although the photoconductor drum 21 has a drum-like shape, the photoconductor drum may have a sheet-like shape or an endless belt-like shape.

EXAMPLES

Hereinafter, examples and reference examples of the present embodiment will be described, but the present embodiment is not limited to these examples at all. Note that the term "part(s)" refers to "part(s) by mass" unless otherwise specified. Hereinafter, a description will be given of an embodiment in which the cleaning blade substrate illustrated in FIG. 4 includes an elastic edge layer and a base layer.

Preparation of Particle Dispersion for Forming Covering Layer, Preparation of Particle Dispersion A The following were put in a screw tube and stirred with a stirrer or the like to prepare [particle dispersion A]: 6.8 parts of polytetrafluoroethylene (PTFE) micro powder (TF9201Z, manufactured by 3M Company, volume average particle diameter of 200 nm) as particles, 0.2 parts of a VdF-HFP-TFE terpolymer containing vinylidene fluoride (VdF), hexafluoropropylene (HFP), and tetrafluoroethylene (TFE) as a binding component, and 93.0 parts of 1,1,2,2-tetrafluoroethyl 2,2,2-trifluoroethyl ether (HFE-347, manufactured by Tokyo Chemical Industry Co., Ltd.) as fluorine dispersion solvent.

Preparation of Particle Dispersion B

The following were put in a screw tube and stirred with a stirrer or the like to prepare [particle dispersion B]: 6.9 parts of polytetrafluoroethylene (PTFE) micro powder (TF9201Z, manufactured by 3M Company, volume average particle diameter of 200 nm) as particles, 0.1 parts of a VdF-HFP-TFE terpolymer as a binding component, and 93.0 parts of 1,1,2,2-tetrafluoroethyl 2,2,2-trifluoroethyl ether (HFE-347, manufactured by Tokyo Chemical Industry Co., Ltd.) as fluorine dispersion solvent.

Preparation of Particle Dispersion C

The following were put in a screw tube and stirred with a stirrer or the like to prepare [particle dispersion C]: 5.8 parts of polytetrafluoroethylene (PTFE) micro powder (TF9201Z, manufactured by 3M Company, volume average particle diameter of 200 nm) as particles, 1.2 parts of a VdF-HFP-TFE terpolymer as a binding component, and 93.0 parts of 1,1,2,2-tetrafluoroethyl 2,2,2-trifluoroethyl ether (HFE-347, manufactured by Tokyo Chemical Industry Co., Ltd.) as fluorine dispersion solvent.

Preparation of Particle Dispersion D

The following were put in a screw tube and stirred with a stirrer or the like to prepare [particle dispersion D]: 97.0 parts of a polymethyl methacrylate (PMMA) aqueous dispersion (MX100W, manufactured by Nippon Shokubai Co., Ltd., volume average particle diameter of 150 nm) as particles, and 3.0 parts of a polyvinyl butyral (PVB) resin (S-LEC KW-10, manufactured by Sekisui Chemical Co., Ltd., acetalization degree of 9±2 mol %) as a binding component.

Preparation of Particle Dispersion E

The following were put in a screw tube and stirred with a stirrer or the like to prepare [particle dispersion E]: 95.0 parts of a polymethyl methacrylate (PMMA) aqueous dispersion (MX100W, manufactured by Nippon Shokubai Co., Ltd., volume average particle diameter of 150 nm) as particles, and 5.0 parts of a polyvinyl alcohol (PVA) resin (Poval JP-03, manufactured by Japan Vam & Poval Co., Ltd., degree of saponification of 88±2 mol %) as a binding component.

Example 1

Preparation of Blade Substrate in Cleaning Blade

A polyurethane elastomer sheet obtained by centrifugal molding, curing, and post-crosslinking was used for the edge layer and the base layer. The average thickness and Martens hardness (HM) of the edge layer and the base layer are as follows.

Average thickness: 2.0 [mm]

Martens hardness (HM) of edge layer: 0.5 [N/mm$^2$]

Martens hardness (HM) of base layer: 1.1 [N/mm$^2$]

The edge layer and the base layer were bonded to each other to produce a blade substrate. The blade substrate was bonded to a metal plate.

Formation of Covering Layer: Dipping

Figure 6:
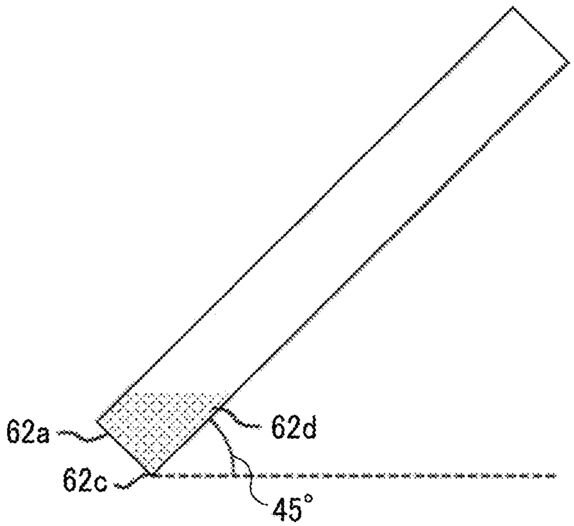
FIG. 6 is a schematic diagram illustrating a state of a method for forming a covering layer performed in Examples.

One end surface (hereinafter, may be referred to as a cleaning blade tip end surface) of a peripheral side surface used as the tip of the cleaning blade was immersed in the [particle dispersion A] by a depth of 2 [mm] from the cleaning blade tip end surface at right angles to a horizontal plane, and was pulled up at a pulling speed of 1 [mm/s]. For the purpose of collecting PTFE particles necessary for the cleaning function in a portion including the contact side on the cleaning blade tip end surface, the cleaning blade of Example 1 was produced by being inclined by about 45° as illustrated in FIG. 6 and dried at normal temperature (25° C.) for 30 minutes.

The average thickness of the covering layer was 0.5 μm.

Examples 2 to 7 and Comparative Examples 1 to 3

Cleaning blades of Examples 2 to 7 and Comparative Examples 1 to 3 were produced in the same manner as in Example 1 except that the type of particle dispersion, the Martens hardness of the base layer, and the average thickness of the covering layer of Example 1 were changed as illustrated in Table 1.

The thickness of the covering layer was controlled by a pulling speed at the time of dipping. Increasing the pulling speed increases the thickness.

Comparative Example 1 is a cleaning blade including a blade substrate on which no covering layer is provided.

Assembly of Image Forming Apparatus

The cleaning blades obtained in Examples 1 to 7 and Comparative Examples 1 to 3 were attached to an image bearer unit of a color multifunction peripheral (imagio MP C4500, manufactured by Ricoh Co., Ltd.), and an image forming apparatus was assembled. A printer unit of the color multifunction peripheral has a configuration similar to the configuration of an image forming apparatus 500 illustrated in FIG. 4. The cleaning blades were attached to the image forming apparatus in such a way as to achieve a linear pressure of 20 g/cm and a cleaning angle of 81°.

Measurement of Average Value of Luminance Histogram

The means of the luminance histograms of the cleaning blades obtained in Examples 1 to 7 and Comparative Examples 1 to 3 were measured. The measurement method described above in the section "Average value of luminance histogram" was adopted as a method for measuring the means of the luminance histograms. The average value of the luminance histogram illustrated in Table 1 shows the median of values measured at four to six points at each measurement location.

Measurement of Martens Hardness

The Martens hardness of the base layer of each of the cleaning blades obtained from Examples 1 to 7 and Comparative Examples 1 to 3 was measured. The Martens hardness (HM) was measured under the same conditions as the measurement conditions described above in the section "Measurement of Martens Hardness". Specifically, measurement was performed in conformity with ISO14577 as follows: a Berkovich indenter was continuously pushed for 10 seconds by means of a nanoindenter (ENT-3100, manufactured by Elionix Inc.) until the maximum load reached 1,000 μN, held for 5 seconds, and unloaded for 10 seconds at the same loading speed. Results are illustrated in Table 1. The location of measurement of the Martens hardness in the base layer was set to the point located inward from the end portion of the base layer, the point being located at a distance of 20 μm. The Martens hardness indicates the median of values measured at four to six points at each measurement location.

Measurement of Average Thickness of Covering Layer

The average thickness of the covering layer on each of the cleaning blades obtained from Examples 1 to 7 and Comparative Examples 1 to 3 was measured. Results are illustrated in Table 1. The average thickness was measured as follows: a part of the covering layer was scraped with a spatula, a cotton swab, or the like, and shape measurement was performed by means of a contact-type surface roughness meter (Surftest SJ-500: manufactured by Mitutoyo Corporation).

Evaluation of Torque Increase Rate

Output was performed by use of the image forming apparatus under the following conditions, and the rate of change of increase in the driving torque of the image bearer was measured. After the output, the tip portion of the cleaning blade was observed with a laser microscope (LEXT OLS4100, manufactured by Olympus Corporation), and the rate of increase in torque was evaluated based on the following evaluation criteria. Evaluation results are illustrated in Table 1. Note that the term "initial" in the evaluation criteria refers to a period during which first to 500th sheets were output.

Environment: 23° C./45% RH

Paper feeding condition: blank chart

Number of output sheets: 5,000 sheets (A4 size horizontal)

Evaluation Criteria

⊚: Torque increased by 50% or less of an initial value, and there was no stop of the image bearer due to the driving torque increase. Furthermore, even when the tip portion of the cleaning blade was observed after the output, there was no trace of being turned up.

○: Torque increased by 50% or less of the initial value, and there was no stop of the image bearer due to the driving torque increase. When the tip portion of the cleaning blade was observed after the output, there was a trace of being turned up. However, since the tip portion of the cleaning blade was not turned up to such a degree that the toner might come out, there is no problem in practical use.

x: There was a stop of the image bearer due to an increase in torque, and when the tip portion of the cleaning blade was observed after the output, there was a trace of being turned up to such a degree that the toner might come out, which may cause a problem in practical use.

Image Quality Evaluation (Cleaning Performance)

Output was performed by use of the image forming apparatus under the following conditions. Thereafter, the tip portion of the cleaning blade and the surface of the image bearer were observed with a laser microscope (LEXT OLS4100, manufactured by Olympus Corporation) and evaluated on the basis of the following evaluation criteria. Evaluation results are illustrated in Table 1.

Environment: 27° C./80% RH

Paper feeding condition: full solid images are continuously fed

Number of output sheets: 2,000 sheets (A4 size horizontal)

Evaluation Criteria

GOOD: Toner that has passed through due to a cleaning failure cannot be found on the printing paper or the image bearer by a visual check, and even when the image bearer is observed with a microscope in the longitudinal direction, the streak-like passing through of toner cannot be found.

FAIR: Toner that has passed through due to a cleaning failure cannot be found on the printing paper or the image bearer by a visual check, but when the image bearer is observed with a microscope in the longitudinal direction, the streak-like passing through of toner can be found.

POOR: Toner that has passed through due to a cleaning failure can be found on both the printing paper and the image bearer by a visual check.

TABLE 1

| | | | Examples | | | | | | |
|---|---|---|---|---|---|---|---|---|---|
| | | | 1 | 2 | 3 | 4 | 5 | 6 | 7 |
| Covering layer | Particle dispersion used for forming covering layer | | A | B | C | A | B | D | E |
| | Particles | PTFE (particle diameter: 0.200 [μm]) | 6.8 | 6.9 | 5.8 | 6.8 | 6.9 | — | — |
| | | PMMA (particle diameter: 0.150 [μm]) | — | — | — | — | — | 97.0 | 95.0 |
| | Binding component | VdF/HFP/TFE | 0.2 | 0.1 | 1.2 | 0.2 | 0.1 | — | — |
| | | Polyvinyl butyral | — | — | — | — | — | 3.0 | — |
| | | Polyvinyl alcohol | — | — | — | — | — | — | 5.0 |
| | Dispersion solvent | 1,1,2,2-tetrafluoroethyl 2,2,2-trifluoroethyl ether | 93.0 | 93.0 | 93.0 | 93.0 | 93.0 | 92.0 | 92.0 |
| | Average thickness [μm] | | 0.5 | 6.5 | 4.0 | 4.0 | 10.0 | 7.5 | 7.0 |
| | Average value of luminance histogram | | 15,000 | 21,600 | 16,900 | 20,500 | 25,000 | 22,100 | 23,200 |
| Blade substrate | Martens hardness [$N/mm^2$] in base layer | | 2.0 | 2.0 | 2.0 | 0.5 | 1.5 | 0.5 | 0.5 |
| Evaluation | Torque increase rate | | FAIR | GOOD | FAIR | GOOD | GOOD | FAIR | FAIR |
| | Cleaning performance | | GOOD | FAIR | FAIR | GOOD | FAIR | FAIR | FAIR |

TABLE 1-continued

| | | | Comparative examples 1 | Comparative examples 2 | Comparative examples 3 |
|---|---|---|---|---|---|
| Covering layer | Particle dispersion used for forming covering layer | | — | B | C |
| | Particles | PTFE (particle diameter: 0.200 [μm]) | — | 6.9 | 5.8 |
| | | PMMA (particle diameter: 0.150 [μm]) | — | — | — |
| | Binding component | VdF/HFP/TFE | — | 0.1 | 1.2 |
| | | Polyvinyl butyral | — | — | — |
| | | Polyvinyl alcohol | — | — | — |
| | Dispersion solvent | 1,1,2,2-tetrafluoroethyl 2,2,2-trifluoroethyl ether | — | 93.0 | 93.0 |
| | Average thickness [μm] | | — | 10.5 | 0.5 |
| | Average value of luminance histogram | | 12,900 | 25,700 | 14,300 |
| Blade substrate | Martens hardness [N/mm$^2$] in base layer | | 2.0 | 0.5 | 2.0 |
| Evaluation | Torque increase rate | | POOR | FAIR | POOR |
| | Cleaning performance | | GOOD | POOR | FAIR |

A cleaning blade includes: a blade substrate including an elastic member having a tip portion to contact with a surface of an object to clean the object; a blade support supporting the blade substrate; and a covering layer on the tip portion of the elastic member, and the covering layer has an average value of luminance histogram of 15,000 or more and 25,000 or less at a point 100 μm inward from a tip ridge of the tip portion of the elastic member.

The covering layer has the average value of the luminance histogram of 18,000 or more and 22,000 or less at the point 100 μm inward from the tip ridge. The covering layer has a thickness of 0.5 μm or more and 10 μm or less at the point 100 μm inward from the tip ridge. The covering layer includes: particles; and a resin, the resin binding the particles and the elastic member.

The covering layer has: a coating film including PTFE particles and a fluororesin; or a coating film including acrylic particles and a polyvinyl alcohol resin or a polyvinyl acetal resin. The blade substrate has: a single-layer structure of polyurethane rubber, or a layered structure including multiple layers of polyurethane rubber different in Martens hardness. The blade substrate has a single-layer structure of polyurethane rubber, and the polyurethane rubber has a Martens hardness of 0.5 N/mm2 or more and 2 N/mm2 or less.

A process cartridge includes: at least one of: an image bearer; a charger to charge a surface of the image bearer, an exposing device to expose the surface of the image bearer to form an electrostatic latent image; a developer to develop the electrostatic latent image into a toner image; a transferring device to transfer the toner image to a recording medium; or a cleaner to contact with the surface of the image bearer to clean the surface of the image bearer, the cleaner including the cleaning blade.

An image forming apparatus includes: an image bearer; a charger to charge a surface of the image bearer; an exposing device to expose the surface of the image bearer to form an electrostatic latent image; a developer to develop the electrostatic latent image into a toner image; a transferring device to transfer the toner image to a recording medium; a fixing device to fix the toner image transferred to the recording medium; and a cleaner to contact with the surface of the image bearer to clean the surface of the image bearer, the cleaner including the cleaning blade.

Aspects of the present embodiment are, for example, as follows.

(Aspect 1) According to Aspect 1, a cleaning blade comes into contact with a surface of a member to be cleaned, and removes a residue on the surface of the member to be cleaned. The cleaning blade includes:

a cleaning blade substrate including an elastic member; and a cleaning blade support that supports the cleaning blade substrate, wherein the elastic member includes a covering layer provided at a tip portion to be brought into contact with the member to be cleaned, and a mean of a luminance histogram is 15,000 or more and 25,000 or less at a point located inward from a tip ridge in the covering layer on a lower surface of the cleaning blade substrate, the point being located at a distance of 100 μm from the tip ridge.

(Aspect 2) According to Aspect 2, in the cleaning blade of Aspect 1, the average value of the luminance histogram is 18,000 or more and 22,000 or less at the point located inward from the tip ridge in the covering layer on the lower surface of the cleaning blade substrate, the point being located at a distance of 100 μm from the tip ridge.

(Aspect 3) According to Aspect 3, in the cleaning blade of Aspect 1 or 2, a thickness of the covering layer on the lower surface of the cleaning blade substrate is 0.5 μm or more and 10 μm or less at the point located inward from the tip ridge of the cleaning blade, the point being located at a distance of 100 μm from the tip ridge.

(Aspect 4) According to Aspect 4, in the cleaning blade of any one of Aspects 1 to 3, the covering layer includes particles and a resin, the resin functioning as a binding component for binding the particles and the elastic member together.

(Aspect 5) According to Aspect 5, in the cleaning blade of any one of Aspects 1 to 4, the covering layer is a coating film including PTFE particles and a fluororesin, or a coating film including acrylic particles and a polyvinyl alcohol resin or a polyvinyl acetal resin.

(Aspect 6) According to Aspect 6, in the cleaning blade of any one of Aspects 1 to 5, the substrate of the cleaning blade has a single-layer structure of polyurethane rubber, or a layered structure including multiple layers of polyurethane rubber different in Martens hardness.

(Aspect 7) According to Aspect 7, in the cleaning blade of Aspect 6, the substrate of the cleaning blade has a single-layer structure of polyurethane rubber, and the polyurethane rubber has a Martens hardness of 0.5 [N/mm$^2$] or more and 2 [N/mm$^2$] or less.

(Aspect 8) According to Aspect 8, a process cartridge includes: an image bearer; at least one of a charger that charges a surface of the image bearer, an exposing device that exposes the charged surface of the image bearer to form an electrostatic latent image, a developer that develops the electrostatic latent image into a toner image, and a transferring device that transfers the toner image to a recording medium; and a cleaner that comes into contact with the surface of the image bearer to remove a residue on the surface of the image bearer, wherein the cleaner includes the cleaning blade of any one of Aspects 1 to 7.

(Aspect 9) According to Aspect 9, an image forming apparatus includes: an image bearer; a charger that charges a surface of the image bearer; an exposing device that exposes the charged surface of the image bearer to form an electrostatic latent image; a developer that develops the electrostatic latent image into a toner image; a transferring device that transfers the toner image to a recording medium; a fixing device that fixes the toner image transferred to the recording medium; and a cleaner that comes into contact with the surface of the image bearer to remove a residue on the surface of the image bearer, wherein the cleaner includes the cleaning blade of any one of Aspects 1 to 7.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. A cleaning blade comprising:
a blade substrate including an elastic member having a tip portion to contact with a surface of an object to clean the object;
a blade support supporting the blade substrate; and
a covering layer on the tip portion of the elastic member,
wherein the covering layer has an average value of luminance histogram of 15,000 or more and 25,000 or less at a point 100 μm inward from a tip ridge of the tip portion of the elastic member.

2. The cleaning blade according to claim 1,
wherein the covering layer has the average value of the luminance histogram of 18,000 or more and 22,000 or less at the point 100 μm inward from the tip ridge.

3. The cleaning blade according to claim 2,
wherein the covering layer has a thickness of 0.5 μm or more and 10 μm or less at the point 100 μm inward from the tip ridge.

4. The cleaning blade according to claim 2,
wherein the covering layer includes:
particles; and
a resin, the resin binding the particles and the elastic member.

5. The cleaning blade according to claim 2,
wherein the covering layer has:
a coating film including PTFE particles and a fluororesin; or
a coating film including acrylic particles and a polyvinyl alcohol resin or a polyvinyl acetal resin.

6. The cleaning blade according to claim 5,
wherein the blade substrate has a single-layer structure of polyurethane rubber, and
the polyurethane rubber has a Martens hardness of 0.5 N/mm2 or more and 2 N/mm2 or less.

7. The cleaning blade according to claim 2,
wherein the blade substrate has:
a single-layer structure of polyurethane rubber, or
a layered structure including multiple layers of polyurethane rubber different in Martens hardness.

8. A process cartridge comprising:
at least one of:
an image bearer;
a charger to charge a surface of the image bearer,
an exposing device to expose the surface of the image bearer to form an electrostatic latent image;
a developer to develop the electrostatic latent image into a toner image;
a transferring device to transfer the toner image to a recording medium; or
a cleaner to contact with the surface of the image bearer to clean the surface of the image bearer, the cleaner including the cleaning blade according to claim 2.

9. An image forming apparatus comprising:
an image bearer;
a charger to charge a surface of the image bearer;
an exposing device to expose the surface of the image bearer to form an electrostatic latent image;
a developer to develop the electrostatic latent image into a toner image;
a transferring device to transfer the toner image to a recording medium;
a fixing device to fix the toner image transferred to the recording medium; and a cleaner to contact with the surface of the image bearer to clean the surface of the image bearer, the cleaner including the cleaning blade according to claim 2.

10. The cleaning blade according to claim 1, wherein the covering layer has a thickness of 0.5 μm or more and 10 μm or less at the point 100 μm inward from the tip ridge.

11. The cleaning blade according to claim 1, wherein the covering layer includes:

particles; and a resin, the resin binding the particles and the elastic member.

12. The cleaning blade according to claim 1, wherein the covering layer has:

a coating film including PTFE particles and a fluororesin; or a coating film including acrylic particles and a polyvinyl alcohol resin or a polyvinyl acetal resin.

13. The cleaning blade according to claim 12, wherein the blade substrate has a single-layer structure of polyurethane rubber, and the polyurethane rubber has a Martens hardness of 0.5 N/mm2 or more and 2 N/mm2 or less.

14. The cleaning blade according to claim 1, wherein the blade substrate has:

a single-layer structure of polyurethane rubber, or a layered structure including multiple layers of polyurethane rubber different in Martens hardness.

15. A process cartridge comprising:

at least one of:

an image bearer;

a charger to charge a surface of the image bearer, an exposing device to expose the surface of the image bearer to form an electrostatic latent image;

a developer to develop the electrostatic latent image into a toner image;

a transferring device to transfer the toner image to a recording medium; or a cleaner to contact with the surface of the image bearer to clean the surface of the image bearer, the cleaner including the cleaning blade according to claim 1.

16. An image forming apparatus comprising:

an image bearer;

a charger to charge a surface of the image bearer;

an exposing device to expose the surface of the image bearer to form an electrostatic latent image;

a developer to develop the electrostatic latent image into a toner image;

a transferring device to transfer the toner image to a recording medium;

a fixing device to fix the toner image transferred to the recording medium; and a cleaner to contact with the surface of the image bearer to clean the surface of the image bearer, the cleaner including the cleaning blade according to claim 1.

* * * * *